United States Patent Office.

S. K. LIGHTER AND JAS. A. MORRELL, OF HAMILTON, OHIO.

IMPROVEMENT IN MASTIC ROOFING COMPOSITIONS.

Specification forming part of Letters Patent No. 17,883, dated July 28, 1857.

*To all whom it may concern:*

Be it known that we, SAMUEL K. LIGHTER and JAMES A. MORRELL, of Hamilton, in the county of Butler and State of Ohio, have invented a new and useful Improvement in Compositions for Roofing; and we do hereby declare that the following is a full, clear, and exact description of the same and the mode of using it.

The composition is made up as follows: coal-tar, one part or base; pitch-tar, fifty per cent.; rosin, twelve per cent.; india-rubber, six per cent.; gutta-percha, six per cent.; asphaltum, twelve per cent.; gum-shellac, six per cent.; linseed-oil, twelve per cent.; litharge, six per cent.; fire-proof mineral, twelve per cent.; yellow ocher, twelve per cent.; beeswax, three per cent.

Process of manufacturing the composition: Put the oil into a suitable kettle, and with a gentle heat bring it to the boiling-point. Then add the litharge and fire-proof mineral, together with the yellow ocher. Stir the mixture well until the whole is thoroughly melted. Then add the beeswax and stir until it is melted. The rosin, coal-tar, and pitch-tar are then placed in the kettle and the whole well stirred until the last ingredients are fused and incorporated with the mass. The india-rubber and gutta-percha dissolved in spirits of turpentine, and the gum-shellac dissolved in alcohol, and the asphaltum are then added. The mixture is allowed to boil slowly for about ten minutes and then allowed to cool, when it is ready for use.

The following is the manner of using the composition: First prepare the foundation by covering the roof with a layer of heavy brown paper previously saturated with coal-tar and oil, over which stretch canvas tightly. Then with a brush apply the composition, in a cold state, as thick as possible. This coating of the composition is then covered with sand, pounded glass, or any other analogous substance impervious to the action of the atmosphere. The sand or glass will sink into the composition and become incorporated therewith. All loose sand is then removed and another coating of the composition applied, which in its turn receives another covering of sand. Three coats of composition alternating with three coats of sand will form a strong, elastic, durable, and water and fire proof roof-covering.

The functions of the several ingredients making up the composition are as follows: Coal-tar, pitch-tar, and rosin, to form an adhesive body; india-rubber and gutta-percha, to toughen the composition and prevent atmospheric cold from cracking it; asphaltum and gum-shellac, to harden the composition to resist atmospheric action; linseed-oil, litharge, fire-proof mineral, and yellow ocher, designed as driers; beeswax, designed to prevent the flowing of the composition when first applied; sand, glass, &c., to render the composition fire-proof, and to prevent wear from the friction of water passing over it.

This composition will, from its elasticity, withstand any ordinary shrinking, swelling, or curling of the sheathing-boards on which it is laid. It will dry without being sticky, so as to serve for a paint, to cover decks of steamboats, and for other analogous purposes. The sand, glass, smalt, or other substance with which the composition is covered sinks into it, and thus becomes incorporated with it.

A great advantage possessed by this composition over others of a similar character is the fact that it is to be used in a cold state, thereby rendering it capable of becoming an article of commerce ready for use, the necessity for carrying kettles and pans to the building to be covered being entirely obviated. The function performed by the beeswax renders it capable of being applied to the most inclined surfaces without running.

What we claim, and desire to secure by Letters Patent, is—

The roofing composition herein described, composed of the several substances in substantially the proportions specified, prepared and used in the manner set forth.

In testimony whereof we have hereunto signed our names before two subscribing witnesses.

SAMUEL K. LIGHTER.
JAMES A. MORRELL.

Witnesses:
C. SMITH,
B. STOMPS.